July 16, 1929.  E. T. HARRIS  1,720,674
CASTER
Filed May 13, 1926
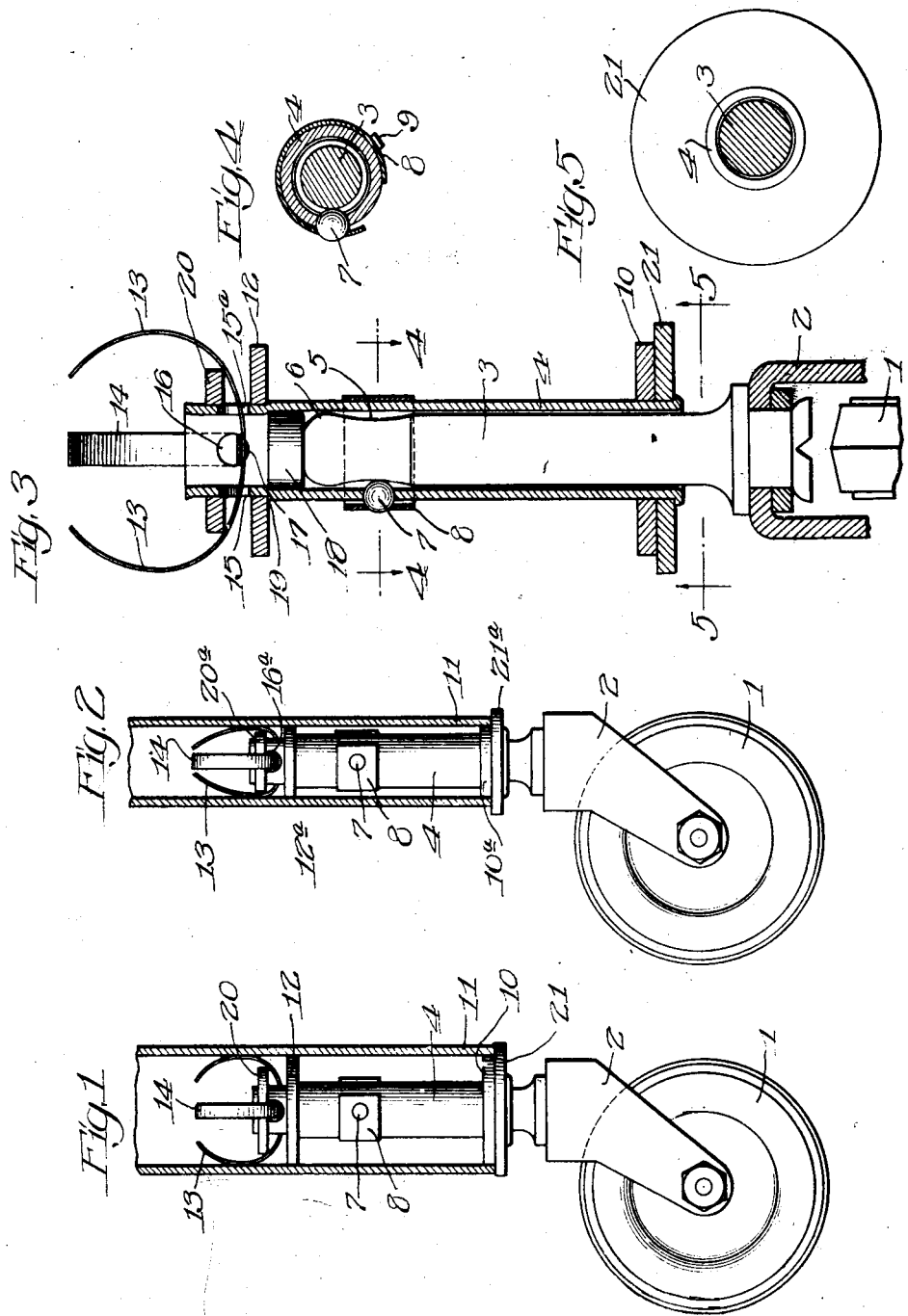
Inventor:
Elijah T. Harris
By Parker + Carter attys.

Patented July 16, 1929.

1,720,674

UNITED STATES PATENT OFFICE.

ELIJAH T. HARRIS, OF CHICAGO, ILLINOIS.

CASTER.

Application filed May 13, 1926. Serial No. 108,849.

This invention relates to casters and has for one object to provide a new and improved device of this description. The invention has as a further object to provide a caster wherein the caster spindle will be securely held in the socket and this socket be securely held in the receiving part so that it cannot easily be thrown out of alignment. The invention has as a further object to provide a caster wherein the socket for the caster spindle may be adjusted to fit receiving devices of varying sizes. The invention has further objects which are more particularly pointed out in the accompanying description.

Referring now to the drawings, Fig. 1 is a view in part section showing one form of caster embodying the invention;

Fig. 2 is a view similar to Fig. 1 in part section showing the parts after adjustment has been made for a smaller receiving device;

Fig. 3 is an enlarged view in part section showing the caster separate from the receiving device;

Fig. 4 is a sectional view taken on the line 4—4 of Fig. 3;

Fig. 5 is a sectional view taken on the line 5—5 of Fig. 3.

Like numerals refer to like parts throughout the several figures.

Referring now to the drawings, the caster is provided with a wheel 1 which is rotatably mounted in the frame 2 to which is connected the spindle 3 which projects into the socket 4. Some means is provided for holding the spindle against longitudinal movement in the socket but permitting rotary movement therein. In the construction shown, the spindle is provided near one end with a reduced portion 5. The socket 4 is provided with an opening into which is received a holding piece 7 which normally engages the reduced portion 5 so as to hold the spindle 3 into position and prevent its dropping out under ordinary conditions or by its own weight. The holding device is arranged so that the spindle can be pushed into the socket or withdrawn from the socket by applying force to the spindle. In order to permit this the holding piece 7 is engaged by a spring member 8 which is fastened to the socket 4 in any desired manner as by means of the fastening device 9. When the spindle is pushed in the fastening piece 7 is pushed outwardly, the spring giving to permit this and when the enlarged end 9 of the spindle passes by the fastening piece, the spring then forces the fastening piece inwardly so that it engages the reduced portion 5. This holds the spindle against accidental removal and yet permits its rotation in the socket. In the particular construction herein illustrated the fastening piece 7 is shown as a ball and the spring 8 is provided with an opening smaller in diameter than the ball into which a portion of the ball is received. The socket 4 is provided at its lower end with an engaging member 10 which is adapted to engage the tube or receiving member 11 attached to the device in connection with which the caster is to be used.

This engaging member 10 is of such size as to closely fit the receiving member 11 but is preferably slightly smaller in diameter than the interior diameter of this member. I prefer also to provide the engaging member 12 near the top of the caster socket. The caster socket is also provided with means which elastically engage the interior of the receiving member 11. In the construction shown, this socket is provided with spring members 13 and 14. These spring members are preferably arranged so as to have four parts which engage the receiving member. As herein shown, they consist of two members of spherical shape with a portion of the members omitted so that four ends are formed which can be moved toward or from each other when pressure is applied thereto. The member 13 passes through openings 15 and 15ª in the socket and the member 14 passes through openings 16 and 16ª in the socket. The members are connected together where they cross by means of a suitable fastening piece 17. A stop for the end of the spindle 3 is provided and as herein shown consists of the piece 18 inside of the socket and which closely fits the socket. Some means is provided for preventing the stop 18 from being pushed out of the socket. As herein shown, this is accomplished by a shoulder 19 which is formed by compressing or distorting the socket at the upper end. I prefer also to provide a spreading member 20 for the springs which consists of a washer surrounding the socket. The upper end of the socket is expanded so as to prevent this washer from sliding off the socket. The socket is also provided with a closing piece 21 which closes the end of the receiving member 11 when the spindle is inserted therein.

In Fig. 1, I have shown a device arranged for a receiving member much larger in diameter than the spindle. When it is desired to use the caster in connection with a receiving member of a different size, it is only necessary to change the engaging members 10 and 12 for members of the proper size to be received into the receiving element.

In Fig. 2, I have shown the same caster arranged for a receiving element much smaller in diameter wherein the engaging members have been replaced by 10ª and 12ª of smaller diameter. In this event the spring spreading member 20ª and the closing piece 21ª are also smaller in diameter than those shown in Fig. 1.

It will be seen that by means of this construction, the device can be readily adapted for receiving elements of any desired size and that when placed in such receiving elements the caster will be held securely and there is no danger of it being thrown out of vertical alignment or distorted or of its accidental dropping out.

It will further be seen that only one size of spindle springs and socket is necessary for any size of receiving element thereby greatly cheapening the manufacture and giving the device a large range of adaptability and use.

I have described in detail a particular device embodying the invention but it is of course evident that the parts may vary in many particulars without departing from the spirit of the invention as embodied in the claims hereto appended and I therefore do not limit myself to the particular construction shown.

I claim:

1. A caster comprising a wheel, a spindle with which said wheel is connected, a socket forming a part of the caster adapted to be inserted into a receiving element of the device with which the caster is used and in which said spindle is received, a spring connected with the upper end of said socket and which projects upwardly therefrom adapted to engage the receiving element, into which the socket is received.

2. A caster comprising a wheel, a spindle with which said wheel is connected, a socket forming a part of the caster adapted to be inserted into a receiving element of the device with which the caster is used and in which said spindle is received, a spring connected with the upper end of said socket and which projects upwardly therefrom and formed of approximately spherical shape adapted to engage the receiving element, into which the socket is received, an engaging member connected with the socket and adapted to be received in the receiving member so as to substantially hold the socket against lateral movement therein.

3. A caster comprising a spindle, a socket for said spindle, spindle provided with a reduced portion near its inner end, a holding piece adapted to engage said reduced portion and prevent the accidental removal of the spindle from the socket, said holding piece projecting through the socket, and a spring member engaging said holding piece so as to permit it to be moved by the pressure of the spindle on the fastening piece to permit the spindle to be inserted in and withdrawn from the socket.

4. A caster comprising a spindle, a socket therefor, two spring members at an angle to each other and which pass through openings in the upper end of said socket and which are bent upwardly to bring their free ends into proximity.

5. A caster comprising a spindle, a socket therefor, two spring members at an angle to each other and which pass through openings in the upper end of said socket and which are bent upwardly to bring their free ends into proximity, said springs when normally expanded extending a considerable distance on the opposite sides of the socket, said springs adapted to be compressed so as to permit the socket to be used in connection with receiving elements of different sizes.

6. A caster comprising a spindle, a wheel connected with said spindle, a socket for said spindle, a reduced portion on said spindle, an opening in said socket opposite said reduced portion, a ball extending through said opening and engaging said spindle at the reduced portion and a spring surrounding said socket and engaging said loose piece.

Signed at Chicago, county of Cook, and State of Illinois, this fifteenth day of April, 1926.

ELIJAH T. HARRIS.